United States Patent
Mizuguchi

(10) Patent No.: US 10,901,264 B2
(45) Date of Patent: Jan. 26, 2021

(54) LIGHT DIFFUSION PLATE AND BACKLIGHT UNIT

(71) Applicant: KEIWA INC., Tokyo (JP)

(72) Inventor: Takuya Mizuguchi, Tokyo (JP)

(73) Assignee: KEIWA INC., Tokyo (JP)

( * ) Notice: Subject to any disclaimer, the term of this patent is extended or adjusted under 35 U.S.C. 154(b) by 0 days.

(21) Appl. No.: 16/530,076

(22) Filed: Aug. 2, 2019

(65) Prior Publication Data

US 2020/0041846 A1 Feb. 6, 2020

(30) Foreign Application Priority Data

Aug. 3, 2018 (JP) ................................. 2018-147187

(51) Int. Cl.
*G02F 1/13357* (2006.01)
*G02B 5/02* (2006.01)

(52) U.S. Cl.
CPC ...... *G02F 1/133611* (2013.01); *G02B 5/0263* (2013.01); *G02F 1/133603* (2013.01); *G02F 1/133606* (2013.01)

(58) Field of Classification Search
CPC ......... G02F 1/133611; G02F 1/133603; G02F 1/133606; G02F 1/1335; G02B 5/0263; G02B 5/02
See application file for complete search history.

(56) References Cited

U.S. PATENT DOCUMENTS

| | | | | |
|---|---|---|---|---|
| 5,079,675 A | * | 1/1992 | Nakayama | G02B 6/0038 362/23.15 |
| 5,386,347 A | * | 1/1995 | Matsumoto | G02B 6/0036 362/23.15 |
| 6,334,689 B1 | * | 1/2002 | Taniguchi | G02B 6/0036 362/19 |
| 6,612,722 B2 | * | 9/2003 | Ryu | G02B 6/0036 349/65 |
| 6,827,457 B2 | * | 12/2004 | Umemoto | G02B 6/0036 362/23.13 |
| 7,226,200 B2 | * | 6/2007 | Tsai | G02B 6/0036 362/607 |
| 7,478,942 B2 | * | 1/2009 | Kim | G02B 6/0036 349/65 |

(Continued)

FOREIGN PATENT DOCUMENTS

JP 2008-282744 A 11/2008

*Primary Examiner* — Anabel Ton
(74) *Attorney, Agent, or Firm* — Norris McLaughlin, P.A.

(57) ABSTRACT

Provided is a light diffusion plate that enables uniformization of luminance easily and reliably. The light diffusion plate is to be placed on a side of a light-emitting face of at least one light source, and comprises: a substrate layer that is light-diffusible and has a light-incident face to be opposed to the light-emitting face, and a light-outputting face on an opposite side of the light-incident face; a reflecting dot pattern that is provided on a side of the light-incident face or the light-outputting face of the substrate layer and includes a plurality of reflecting dots; and the light-shielding dot pattern that is provided on a side of the light-incident face or the light-outputting face of the substrate layer and includes a plurality of light-shielding dots, in which the reflecting dot pattern and the light-shielding dot pattern overlap at least partially in a planar view.

9 Claims, 15 Drawing Sheets

(56) References Cited

U.S. PATENT DOCUMENTS

| | | | | |
|---|---|---|---|---|
| 7,507,011 B2 * | 3/2009 | Ueno | ............... | G02B 6/0028 |
| | | | | 362/612 |
| 2009/0091919 A1 * | 4/2009 | Goto | ............... | G02F 1/133603 |
| | | | | 362/97.1 |
| 2011/0234942 A1 * | 9/2011 | Nakagome | ........ | G02F 1/133606 |
| | | | | 349/64 |
| 2013/0063826 A1 * | 3/2013 | Hoffmuller | .......... | B42D 25/425 |
| | | | | 359/619 |
| 2019/0251897 A1 * | 8/2019 | Toyama | ............... | G02B 5/0278 |

\* cited by examiner

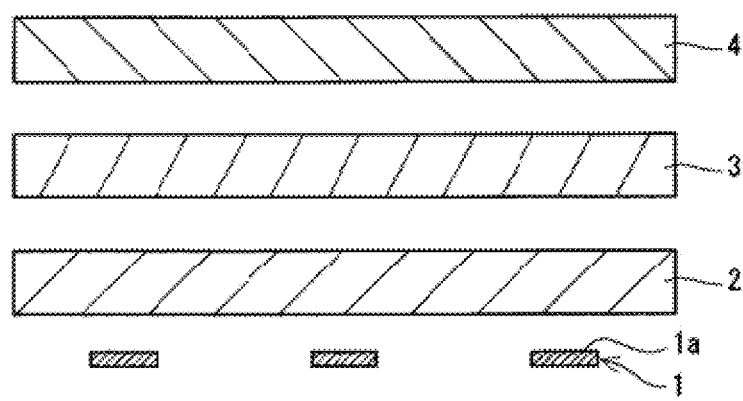
F I G. 1

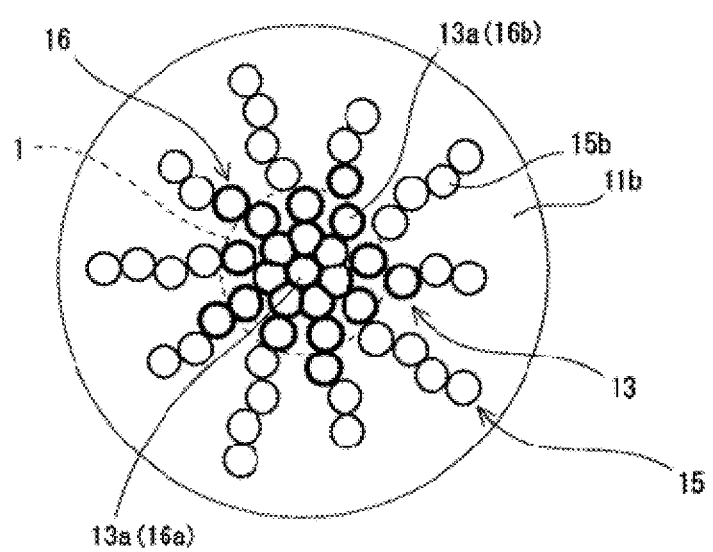
F I G. 4

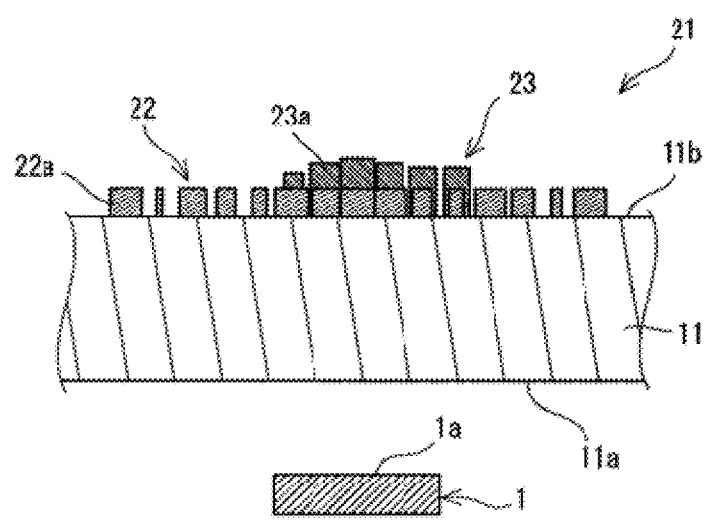
F I G. 6

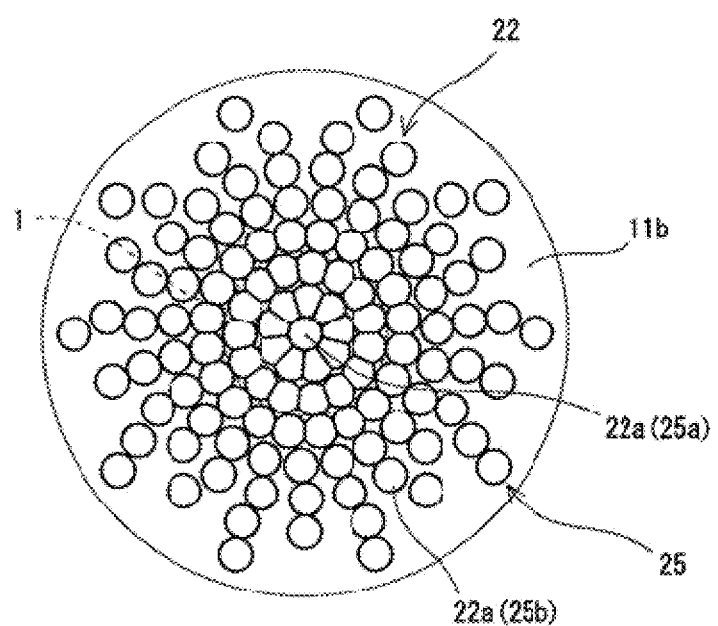
F I G. 7

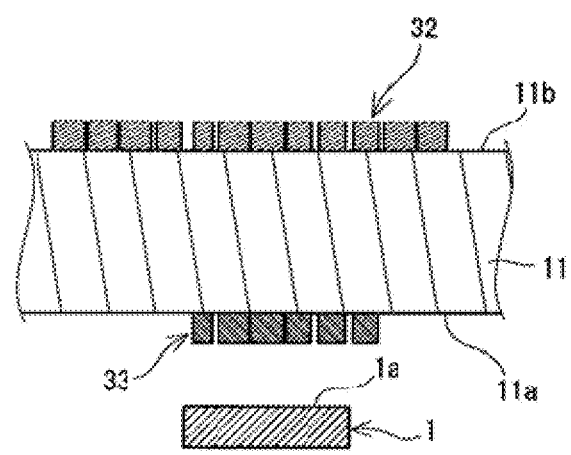
F I G. 9

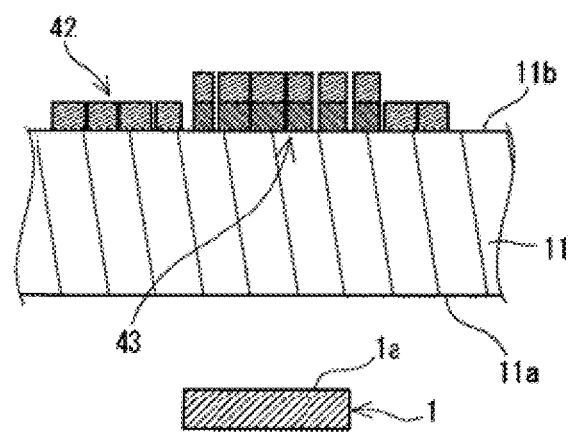
F I G. 10

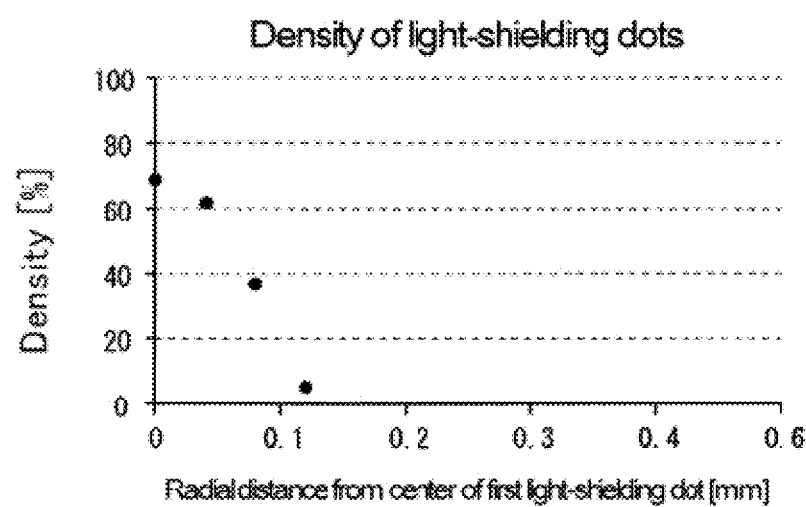
F I G. 12

LIGHT DIFFUSION PLATE AND BACKLIGHT UNIT

BACKGROUND OF THE INVENTION

Field of the Invention

The present invention relates to a light diffusion plate and a backlight unit.

Discussion of the Background

Backlight systems, which illuminate a liquid crystal layer from behind, are in widespread use as a transmissive liquid crystal display device, and the transmissive liquid crystal display device is equipped with an edge-lit (side-lit) backlight unit, a direct-lit backlight unit or the like on the back face side of the liquid crystal layer. Of these, the direct-lit backlight unit is provided with at least one light source and a light diffusion plate on a side of a light emitting face of the light source. In the direct-lit backlight unit, an attempt of obtaining uniform luminance is made by diffusing rays of light emitted from the at least one light source by the light diffusion plate.

However, in the direct-lit backlight unit, since the rays of light emitted from the at least one light source are transmitted in a thickness direction of the light diffusion plate, a hot spot is generated at a position corresponding to the light source in a planar view, in which an amount of rays of light output from a surface is greater than in other parts, leading to a lack in uniformity of luminance of a liquid crystal display device.

In view of such an inconvenience, it has been currently proposed to provide, on a face of the light diffusion plate opposed to the light source, a dot pattern including a plurality of reflecting dots containing a white pigment (see Japanese Unexamined Patent Application, Publication No. 2008-282744).

PRIOR ART DOCUMENTS

Patent Documents

Patent Document 1: Japanese Unexamined Patent Application, Publication No. 2008-282744

SUMMARY OF THE INVENTION

The light diffusion plate disclosed in the above publication is considered to be able to uniformize luminance distribution of the light source to some extent through diffusing and reflecting the light, which is emitted from the light source, by the dot pattern.

However, the present inventor thoroughly investigated to find that it is not easy to form reflecting dots having sufficient reflectance in terms of choice of materials etc., and even in the case in which the aforementioned dot pattern is provided on the light diffusion plate as described in the above publication, generation of the hot spot may not be sufficiently inhibited. In addition, it has also been found that even if the reflectance of the reflecting dots is increased, the reflecting dots are visible due to glare and may rather deteriorate quality of the liquid crystal display device.

The present invention was made in view of the foregoing circumstances, and an object of the present invention is to provide a light diffusion plate and a backlight unit that enable uniformization of luminance easily and reliably.

The present inventor has found that, according to a light diffusion plate comprising: a substrate layer; a reflecting dot pattern that is provided on a side of a light-incident face or a light-outputting face of the substrate layer and comprises a plurality of reflecting dots; and a light-shielding dot pattern that is provided on a side of the light-incident face or the light-outputting face of the substrate layer and comprises a plurality of light-shielding dots, in which the reflecting dot pattern and the light-shielding dot pattern overlap at least partially in a planar view, at least a part of the rays of light transmitted (or to be transmitted) through the reflecting dot pattern can be shielded by the light-shielding dot pattern, whereby generation of the hot spot can be inhibited. The present inventor has also found that, by thus inhibiting the generation of the hot spot, glare caused by the reflecting dots can be suppressed.

More specifically, the light diffusion plate according to an aspect of the present invention made for solving the aforementioned problems is a light diffusion plate to be placed on a side of a light-emitting face of at least one light source, the light diffusion plate comprising: a substrate layer that is light-diffusible and comprises a light-incident face to be opposed to the light-emitting face, and a light-outputting face on an opposite side of the light-incident face; a reflecting dot pattern that is provided on a side of the light-incident face or the light-outputting face of the substrate layer and comprises a plurality of reflecting dots; and a light-shielding dot pattern that is provided on a side of the light-incident face or the light-outputting face of the substrate layer and comprises a plurality of light-shielding dots, in which the reflecting dot pattern and the light-shielding dot pattern overlap at least partially in a planar view.

Due to including: the reflecting dot pattern that is provided on a side of the light-incident face or the light-outputting face of the substrate layer and comprises a plurality of reflecting dots; and the light-shielding dot pattern that is provided on a side of the light-incident face or the light-outputting face of the substrate layer and comprises a plurality of light-shielding dots, in which the reflecting dot pattern and the light-shielding dot pattern overlap at least partially in a planar view, uniformization of luminance is enabled easily and reliably.

It is preferred that: the plurality of reflecting dots comprise at least one first reflecting dot and a plurality of second reflecting dots that surround the at least one first reflecting dot, and the reflecting dot pattern comprises at least one reflecting region in which a density of the plurality of second reflecting dots gradually decreases outward in a radial direction of the first reflecting dot; the plurality of light-shielding dots comprise at least one first light-shielding dot and a plurality of second light-shielding dots that surround the at least one first light-shielding dot, and the light-shielding dot pattern comprises at least one light-shielding region in which a density of the plurality of second light-shielding dots gradually decreases outward in a radial direction of the first light-shielding dot; and the at least one first reflecting dot and the at least one first light-shielding dot overlap at least partially in a planar view. When the at least one first reflecting dot and the at least one first light-shielding dot are thus provided to overlap at least partially in a planar view, uniformity of luminance can be easily improved.

It is preferred that the plurality of second reflecting dots are arranged circularly to exhibit nested circles, and the plurality of second light-shielding dots are arranged circularly to exhibit nested circles. When the plurality of second reflecting dots are arranged circularly to exhibit nested circles and the plurality of second light-shielding dots are arranged circularly to exhibit nested circles, uniformity of luminance can be improved more easily.

It is preferred that, among the nested circles, circles in the reflecting region are greater in number than circles in the light-shielding region. When the circles in the reflecting region are greater in number than the circles in the light-shielding region, the rays of light transmitted (or to be transmitted) through the reflecting dots can be shielded by the light-shielding dots selectively and effectively in a region immediately above the at least one light source, whereby uniformity of luminance can be further improved.

It is preferred that, in the at least one light-shielding region, the light-shielding dots overlap the reflecting dots on one-to-one basis in a planar view. When, in the at least one light-shielding region, the light-shielding dots overlap the reflecting dots on one-to-one basis in a planar view, the rays of light transmitted (or to be transmitted) through the reflecting dots can be shielded by the light-shielding dots selectively, whereby uniformity of luminance can be further improved.

It is preferred that an average diameter of the plurality of reflecting dots is no less than 1 μm and no greater than 60 μm, and a ratio of an average diameter of the plurality of light-shielding dots to the average diameter of the plurality of reflecting dots is no less than 0.7 and no greater than 1.3. When the average diameter of the plurality of reflecting dots and the ratio of an average diameter of the plurality of light-shielding dots to the average diameter of the plurality of reflecting dots fall within the above ranges, fine control of an amount of the rays of light output from the light diffusion plate is facilitated, whereby uniformization of luminance is easily promoted.

It is preferred that the substrate layer, the reflecting dot pattern and the light-shielding dot pattern are provided in this order in a direction of light emission of the at least one light source. When the substrate layer, the reflecting dot pattern and the light-shielding dot pattern are thus provided in this order in a direction of light emission of the at least one light source, reliable shielding of the rays of light transmitted through the reflecting dot pattern is facilitated. Consequently, uniformization of luminance is easily promoted.

A backlight unit according to another aspect of the present invention made for solving the aforementioned problems comprises at least one light source comprising a light-emitting face, and a light diffusion plate placed on a side of the light-emitting face of the at least one light source, the light diffusion plate comprising: a substrate layer that is light-diffusible and comprises a light-incident face to be opposed to the light-emitting face, and a light-outputting face on an opposite side of the light-incident face; a reflecting dot pattern that is provided on a side of the light-incident face or the light-outputting face of the substrate layer and comprises a plurality of reflecting dots; and a light-shielding dot pattern that is provided on the side of the light-incident face or the light-outputting face of the substrate layer and comprises a plurality of light-shielding dots, in which the reflecting dot pattern and the light-shielding dot pattern overlap at least partially in a planar view.

Due to the backlight unit comprising a light diffusion plate placed on a side of the light-emitting face of the at least one light source, the light diffusion plate comprising: the reflecting dot pattern that is provided on a side of the light-incident face or the light-outputting face of the substrate layer and comprises a plurality of reflecting dots; and a light-shielding dot pattern that is provided on the side of the light-incident face or the light-outputting face of the substrate layer and comprises a plurality of light-shielding dots, in which the reflecting dot pattern and the light-shielding dot pattern overlap at least partially in a planar view, uniformization of luminance is enabled easily and reliably.

It is preferred that, the plurality of reflecting dots comprise at least one first reflecting dot and a plurality of second reflecting dots that surround the at least one first reflecting dot, and the reflecting dot pattern comprises at least one reflecting region in which a density of the plurality of second reflecting dots gradually decreases outward in a radial direction of the first reflecting dot; the plurality of light-shielding dots comprise at least one first light-shielding dot and a plurality of second light-shielding dots that surround the at least one first light-shielding dot, and the light-shielding dot pattern comprises at least one light-shielding region in which a density of the plurality of second light-shielding dots gradually decreases outward in a radial direction of the first light-shielding dot; and the at least one first reflecting dot, the at least one first light-shielding dot, and the light-emitting face of the light source overlap at least partially in a planar view. When the plurality of reflecting dots comprise at least one first reflecting dot and a plurality of second reflecting dots that surround the at least one first reflecting dot, and the reflecting dot pattern comprises at least one reflecting region in which a density of the plurality of second reflecting dots gradually decreases outward in a radial direction of the first reflecting dot; the plurality of light-shielding dots comprise at least one first light-shielding dot and a plurality of second light-shielding dots that surround the at least one first light-shielding dot, and the light-shielding dot pattern comprises at least one light-shielding region in which a density of the plurality of second light-shielding dots gradually decreases outward in a radial direction of the first light-shielding dot; and the at least one first reflecting dot, the at least one first light-shielding dot, and the light-emitting face of the light source overlap at least partially in a planar view, uniformity of luminance can be easily improved.

It is to be noted that the term "diameter" as referred to herein means a diameter of a perfect circle having the same area obtained by conversion. The "diameter" of the dot (reflecting dot or light-shielding dot) as referred to means a diameter of a bottom of the dot. The "average diameter" of the dot as referred to means an average of the diameters of arbitrarily selected 10 independent dots (dot not constituted of combined multiple dots).

As explained in the foregoing, the light diffusion plate and the backlight unit of the aspects of the present invention enable uniformization of luminance easily and reliably.

BRIEF DESCRIPTION OF THE DRAWINGS

FIG. 1 is a schematic cross sectional view of a backlight unit according to an embodiment of the present invention;

FIG. 4 is a schematic plan view showing the reflecting region and a light-shielding region on the light diffusion plate illustrated in FIG. 2;

FIG. 6 is a schematic end view showing a light diffusion plate and a light source of a backlight unit according to a different embodiment from that of the backlight unit illustrated in FIG. 1;

FIG. 7 is a schematic plan view showing a reflecting region of the light diffusion plate illustrated in FIG. 6;

FIG. 9 is a schematic end view showing a light diffusion plate and a light source of a backlight unit according to a different embodiment from those of the backlight units illustrated in FIGS. 1 and 6;

FIG. 10 is a schematic end view showing a light diffusion plate and a light source of a backlight unit according to a different embodiment from those of the backlight units illustrated in FIGS. 1, 6 and 9;

FIG. 12 is a graph showing a relationship between a radial distance from a center of a first light-shielding dot and a density of the light-shielding dots in Example;

DESCRIPTION OF EMBODIMENTS

Figure 2:
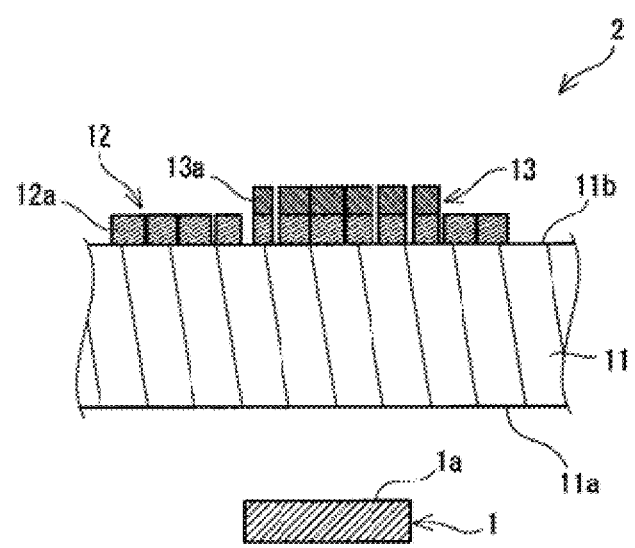
FIG. 2 is a schematic end view of a light diffusion plate and a light source of the backlight unit illustrated in FIG. 1.

Hereinafter, preferred modes for carrying out the invention will be explained in more detail with references to the drawings, if necessary.

First Embodiment

Backlight Unit

The backlight unit illustrated in FIG. 1 is a direct-lit backlight unit for a liquid crystal display device. The backlight unit is provided with: a plurality of LED light sources 1; a light diffusion plate 2; and at least one optical sheet 3, in this order in a direction of light emission of the plurality of LED light sources 1. The backlight unit is further provided with a rectangular tray-like casing (not shown in the figure) that houses the plurality of LED light sources 1, the light diffusion plate 2, and the at least one optical sheet 3. A liquid crystal panel 4 is placed on a side of the at least one optical sheet 3, the side being on a direction of light emission from the plurality of LED light sources 1. The backlight unit is configured such that: rays of light emitted from the plurality of LED light sources 1 are diffused by means of the light diffusion plate 2; and the diffused rays are transmitted through the at least one optical sheet 3 and then incident on the liquid crystal panel 4. The at least one optical sheet 3 is exemplified by a light diffusion sheet, a prism sheet, a micro lens sheet, a polarization reflection sheet and the like, and these sheets can be used in an arbitrary combination.

Light Source

The plurality of LED light sources 1 each have a light-emitting face 1a on a side opposed to the liquid crystal panel 4 (viewer's side). The light-emitting face 1a constitutes an outermost surface of a light-emitting region that emits rays of light. The plurality of LED light sources 1 emit highly directive rays of light from the light-emitting face 1a toward the light diffusion plate 2. The plurality of LED light sources 1 are arranged on a bottom of the casing. The plurality of LED light sources 1 are preferably arranged scatteredly at a predetermined pitch in an equally dense manner, e.g., in a grid pattern (such as a square grid pattern) and the like in a planar view of the backlight unit. The plurality of LED light sources 1 are provided such that the light-emitting faces thereof are at the same distance from the light diffusion plate 2 (more specifically, a substrate layer 11 of the light diffusion plate 2 described later). The configuration that the plurality of LED light sources are arranged in the "grid pattern" as referred to means that each LED light source is arranged at each grid point.

Light Diffusion Plate

The light diffusion plate 2 is placed on a side of the light-emitting faces 1a of the plurality of LED light sources 1. As illustrated in FIG. 2, the light diffusion plate 2 is provided with: a substrate layer 11 that is light-diffusible and has a light-incident face 11a opposed to the light-emitting face 1a and a light-outputting face 11b on an opposite side of the light-incident face 11a; a reflecting dot pattern 12 that is provided on a side of the light-outputting face 11b of the substrate layer 11 and includes a plurality of reflecting dots 12a; and a light-shielding dot pattern 13 that is provided on a side of the light-outputting face 11b of the substrate layer 11 and includes a plurality of light-shielding dots 13a. The reflecting dot pattern 12 and the light-shielding dot pattern 13 overlap at least partially in a planar view. The light diffusion plate 2 does not have any other layer than the substrate layer 11, the reflecting dot pattern 12 and the light-shielding dot pattern 13.

Substrate Layer

The substrate layer 11 has, for example, a substantially cuboid shape of which thickness (length in a direction of opposing of the light-incident face 11a and the light-outputting face 11b) is smaller than a length in a plane direction. The substrate layer 11 corresponds to the frontmost layer of the light incident side of the light diffusion plate 2. The substrate layer 11 includes a resin matrix, and a light diffusing agent contained in the resin matrix. The substrate layer 11 diffuses the rays of light incident on the light-incident face 11a by means of the light diffusing agent, and outputs diffused light from the light-outputting face 11b.

The resin matrix includes a transparent synthetic resin, in particular a colorless and transparent synthetic resin as a principal component since transmitting rays of light is required. The synthetic resin is exemplified by polyethylene terephthalate, polyethylene naphthalate, an acrylic resin, a polycarbonate, a polystyrene, a polyolefin, cellulose acetate, weather resistance vinyl chloride, and the like. It is to be noted that the term "principal component" as referred to means a component included at the greatest proportion by mass, and for example, a component included at a proportion of 50% by mass or greater.

The light diffusing agent is not particularly limited as long as it is capable of diffusing light, and exemplified by an inorganic filler and an organic filler. Examples of the inorganic filler include silica, aluminum hydroxide, aluminum oxide, zinc oxide, barium sulfide, magnesium silicate, and a mixture thereof. Examples of the organic filler include an acrylic resin, an acrylonitrile resin, a polyurethane, a polyvinyl chloride, a polystyrene, a polyacrylonitrile, a polyamide, and the like.

The average thickness of the substrate layer 11 may be, for example, no less than 0.1 mm and no greater than 3.0 mm, approximately.

Reflecting Dot Pattern

The reflecting dot pattern 12 is provided directly on the light-outputting face 11b of the substrate layer 11. The reflecting dot pattern 12 is provided only on a side of the light-outputting face 11b of the substrate layer 11, and not on a side of the light-incident face 11a of the substrate layer 11. The reflecting dot pattern 12 is constituted of a plurality of reflecting dots 12a. The plurality of reflecting dots 12a may be formed by, for example, a printing procedure such as screen printing, ink jet printing, gravure printing, offset lithography, flexography and dispenser printing. Of these printing procedures, screen printing is preferred which enables easy and highly accurate formation of the plurality of reflecting dots 12a. A shape of each of the plurality of reflecting dots 12a is not particularly limited, and may be, for example, a hemispherical shape, a spherical cap shape, and the like.

The plurality of reflecting dots 12a are formed by using, for example, an ink obtained by blending a white pigment or a silver pigment into a binder component for reflecting the rays of light. Thus, the plurality of reflecting dots 12a each contain a resin matrix formed from the binder component being hardened, and the white pigment or the silver pigment contained in the resin matrix. The pigment contained in the binder component is preferably the white pigment. When the plurality of reflecting dots 12a contain the white pigment, the plurality of reflecting dots 12a can be formed relatively inexpensively, and suppression of glare caused by the plurality of reflecting dots 12a is enabled. In addition, when the plurality of reflecting dots 12a contain the white pigment, reflectance of the plurality of reflecting dots 12a tends to be relatively low; however, the light diffusion plate 2 is capable of sufficiently improving uniformity of luminance of the backlight unit since the rays of light transmitted through the plurality of reflecting dots 12a can be shielded by the plurality of light-shielding dots 13a. It is to be noted that the plurality of reflecting dots 12a have a function of reflecting the rays of light, but not a function of absorbing the rays of light.

The binder component is exemplified by a thermosetting or ultraviolet ray-curable resin. Examples of such a resin include an acrylic resin, a polycarbonate, a polyester, an alkyd resin, a polyurethane, an acrylic urethane resin, a polystyrene, a polyacetal, a polyamide, a polyvinyl alcohol, a polyvinyl acetate, a cellulose resin, an ethylcellulose resin, an epoxy resin, a vinyl chloride resin, and the like. These may be used either alone of one type or in combination of two or more types. Of these, the binder component is preferably an acrylic ultraviolet ray-curable resin that is less prone to thermal shrinkage and deformation and consequently enables formation of the reflecting dot 12a of a desired shape with high accuracy.

Examples of the while pigment include titanium oxide (titanium white), zinc oxide (zinc white), lead carbonate (lead white), barium sulfate, calcium carbonate (chalk), and the like. Examples of the silver pigment include metallic pigments such as aluminum.

The lower limit of the reflectance of the plurality of reflecting dots 12a is preferably 30%, and more preferably 40%. Meanwhile, the upper limit of the reflectance of the plurality of reflecting dots 12a may be 100%, 90%, or 80%. The light diffusion plate 2 is capable of sufficiently improving uniformity of luminance of the backlight unit even when the reflectance of the plurality of reflecting dots 12a falls within the above range, since the rays of light transmitted through the plurality of reflecting dots 12a can be shielded by the plurality of light-shielding dots 13a. In addition, by making the reflectance of the plurality of reflecting dots 12a relatively low within the above range, the plurality of reflecting dots 12a on the light diffusion plate 2 may be formed inexpensively. On the other hand, when the reflectance is less than the lower limit, sufficient inhibition of generation of hot spot in the backlight unit may be difficult. It is to be noted that the "reflectance of the plurality of reflecting dots" as referred to means a ratio of total luminous flux [lm] reflected by the plurality of reflecting dots to total luminous flux [lm] incident onto the plurality of reflecting dots, measured by a spectrophotometer.

The plurality of reflecting dots 12a each preferably have a uniform diameter. The lower limit of an average diameter of the plurality of reflecting dots 12a is preferably 1 μm, and more preferably 10 μm. Meanwhile, the upper limit of the average diameter of the plurality of reflecting dots 12a is preferably 60 μm, and more preferably 55 μm. When the average diameter is less than the lower limit, the effect of reflecting the rays of light by each reflecting dot 12a may be insufficient. To the contrary, when the average diameter is greater than the upper limit, a reflecting region for rays of light formed by each reflecting dot 12a may be too large, whereby fine control of the luminance of the backlight unit may be difficult, and eventually uniformization of the luminance of the backlight unit as intended may fail.

Figure 3:
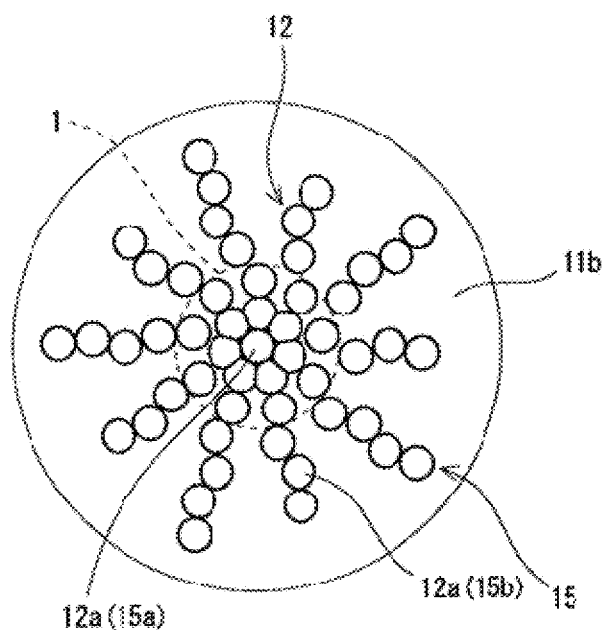
FIG. 3 is a schematic plan view showing a reflecting region of the light diffusion plate illustrated in FIG. 2.

As illustrated in FIG. 3, in the reflecting dot pattern 12, the plurality of reflecting dots include one reflecting dot 12a (first reflecting dot 15a) and a plurality of other reflecting dots 12a (second reflecting dots 15b) that are provided to surround the first reflecting dot 15a, and the reflecting dot pattern 12 has a reflecting region 15 in which a density of the plurality of second reflecting dots 15b gradually decreases outward in a radial direction of the first reflecting dot 15a. In other words, the reflecting region 15 is configured such that, in a plurality of regions having the same width cyclically partitioned (in the present embodiment, in circular shapes) around the first reflecting dot 15a (more particularly a center of the first reflecting dot 15a), the density of the at least one reflecting dot 12a in a more internal region is greater than the density of the at least one reflecting dot 12a in a more external region. In the present embodiment, the reflecting region 15 has a circular shape. The reflecting region 15 may have a dot-filled region formed with the first reflecting dot 15a and the plurality of second reflecting dots 15b linked with each other, at a position overlapping the LED light source 1 in a planar view.

The reflecting dot pattern 12 has a plurality of reflecting regions 15. Each of the reflecting regions 15 is provided to correspond to the LED light source 1 on one-to-one basis so as to encompass the light-emitting face 1a of the LED light source 1 in a planar view. Specifically, the first reflecting dot 15a overlaps at least partially the light-emitting face 1a of the LED light source 1 in a planar view, and more particularly, a center of the first reflecting dot 15a and a center of the light-emitting face 1a of the LED light source 1 are arranged at positions corresponding to one another in a planar view.

The plurality of second reflecting dots 15b are arranged circularly to exhibit nested circles, to surround the first reflecting dot 15a. In addition, the plurality of second reflecting dots 15b are arranged radially around the first reflecting dot 15a. In the reflecting region 15, a density of the plurality of second reflecting dots 15b in a more internal circle is greater than a density of the plurality of second reflecting dots 15b in a more external circle. In other words, an average pitch of the plurality of second reflecting dots 15*b* in a more internal circle is smaller than an average pitch of the plurality of second reflecting dots 15*b* in a more external circle.

It is preferred that the plurality of second reflecting dots 15*b* are arranged at a constant pitch in each circle. When the plurality of second reflecting dots 15*b* are thus arranged at a constant pitch in each circle, a local increase in an amount of rays of light output from a region immediately above the LED light source 1 is inhibited, whereby uniformization of the luminance of the backlight unit may be facilitated. In addition, when the plurality of reflecting dots 12*a* are formed to have a uniform diameter, and the average diameter of the reflecting dots 12*a* is controlled to fall within the above range, uniformization of the luminance of the backlight unit may be more improved.

It is preferred that the plurality of second reflecting dots 15*b* are not sequentially arranged on a straight line passing through a center of the first reflecting dot 15*a*. In other words, the second reflecting dots 15*b* adjacent in a radial direction of the first reflecting dot 15*a* are preferably arranged out of alignment with respect to the radial direction of the first reflecting dot 15*a*. When the plurality of second reflecting dots 15*b* are not sequentially arranged on a straight line passing through a center of the first reflecting dot 15*a*, occurrence of moire may be reduced.

It is to be noted that the reflecting dot pattern 12 may include at least one reflecting dot 12*a* in addition to the plurality of reflecting regions 15; however, in light of easy and reliable control of rays of light, it is preferred that no reflecting dot 12*a* is formed on any region other than the plurality of reflecting regions 15.

In the light diffusion plate 2, due to the reflecting regions 15 being provided on one-to-one basis with the LED light sources 1 at positions overlapping the plurality of LED light sources 1 in a planar view, with the density of the plurality of second reflecting dots 15*b* gradually decreasing outward in the radial direction of the first reflecting dot 15*a* in the reflecting region 15, uniformization of the luminance of the backlight unit may be more improved through allowing rays of light reflected by the reflecting dots 12*a* to output from a region between the LED light sources 1 where no reflecting dot 12*a* is provided, while an amount of rays of light output from a region immediately above the LED light source 1 is reduced by the plurality of reflecting dots 12*a*.

Light-Shielding Dot Pattern

The light-shielding dot pattern 13 is provided on the reflecting dot pattern 12. The light-shielding dot pattern 13 is provided only on a side of the light-outputting face 11*b* of the substrate layer 11, and not on a side of the light-incident face 11*a* of the substrate layer 11. In the light diffusion plate 2, the substrate layer 11, the reflecting dot pattern 12 and the light-shielding dot pattern 13 are provided in this order in a direction of light emission of the plurality of LED light sources 1. The light diffusion plate 2 is thus enabled to reliably shield the rays of light transmitted through the reflecting dot pattern 12, by the light-shielding dot pattern 13. Consequently, with the light diffusion plate 2, promotion of uniformization of luminance of the backlight unit is facilitated. The light-shielding dot pattern 13 is arranged directly on the reflecting dot pattern 12 with no other layer therebetween. The light-shielding dot pattern 13 corresponds to the frontmost layer of the light-outputting side of the light diffusion plate 2.

The light-shielding dot pattern 13 is constituted of a plurality of light-shielding dots 13*a*. The plurality of light-shielding dots 13*a* shield light by absorbing rays of light. The plurality of light-shielding dots 13*a* may be formed by, for example, a printing procedure such as screen printing, ink jet printing, gravure printing, offset lithography, flexography, and dispenser printing. Of these printing procedures, screen printing is preferred which enables easy and highly accurate formation of the plurality of light-shielding dots 13*a*. A shape of each of the plurality of light-shielding dots 13*a* is not particularly limited, and may be, for example, a hemispherical shape, a spherical cap shape, and the like.

The plurality of light-shielding dots 13*a* are formed by using, for example, a black ink for absorbing the rays of light. The black ink is exemplified by: an inorganic ink containing chromium oxide, iron oxide, chromium carbide, tungsten carbide, carbon black, a sintered ceramic body such as mica, or the like; and an organic ink obtained by blending a black dye, a black pigment or the like into a binder component.

The binder component contained in the organic ink is exemplified by a thermosetting or ultraviolet ray-curable resin. Examples of such a resin include an acrylic resin, a polycarbonate, a polyester, an alkyd resin, a polyurethane, an acrylic urethane resin, a polystyrene, a polyacetal, a polyamide, a polyvinyl alcohol, a polyvinyl acetate, a cellulose resin, an ethylcellulose resin, an epoxy resin, a vinyl chloride resin, and the like. These may be used either alone of one type or in combination of two or more types. Of these, the binder component is preferably an acrylic ultraviolet ray-curable resin that is less prone to thermal shrinkage and deformation and consequently enables formation of the light-shielding dot 13*a* of a desired shape with high accuracy.

Examples of the black pigment contained in the organic ink include carbon black, titanium black and the like. Examples of the black dye include C.I. Solvent Black 3, C.I. Solvent Black 7, C.I. Solvent Black 27, and the like.

The lower limit of the light absorption rate of the plurality of light-shielding dots 13*a* is preferably 0.01%, and more preferably 1.00%. When the light absorption rate is less than the lower limit, the effect of absorbing the rays of light by the plurality of light-shielding dots 13*a* may be insufficient. Meanwhile, the upper limit of the light absorption rate of the plurality of light-shielding dots 13*a* may be, for example, 100%. It is to be noted that the "light absorption rate of the plurality of light-shielding dots" as referred to means a ratio of total luminous flux [lm] absorbed by the plurality of light-shielding dots to total luminous flux [lm] incident onto the plurality of light-shielding dots.

The plurality of light-shielding dots 13*a* each preferably have a uniform diameter. The lower limit of an average diameter of the plurality of light-shielding dots 13*a* is preferably 1 μm, and more preferably 10 μm. Meanwhile, the upper limit of the average diameter of the plurality of light-shielding dots 13*a* is preferably 60 μm, and more preferably 55 μm. When the average diameter is less than the lower limit, the effect of absorbing the rays of light by each light-shielding dot 13*a* may be insufficient. To the contrary, when the average diameter is greater than the upper limit, an absorbing region for rays of light formed by each light-shielding dot 13*a* may be too large, whereby fine control of the luminance of the backlight unit may be difficult, and eventually uniformization of the luminance of the backlight unit as intended may fail.

The lower limit of a ratio of the average diameter of the plurality of light-shielding dots 13*a* to the average diameter of the plurality of reflecting dots 12*a* is preferably 0.7 and more preferably 0.8. Meanwhile, the upper limit of the ratio is preferably 1.3, and more preferably 1.2. When the ratio is less than the lower limit, uniformity of luminance of the backlight unit may not be sufficiently improved, since the rays of light transmitted through the plurality of reflecting dots 12a may not be sufficiently shielded by the plurality of light-shielding dots 13a. To the contrary, when the ratio is greater than the upper limit, rays of light output from the light-outputting face 11b of the substrate layer 11 without being incident onto the plurality of reflecting dots 12a may be unduly shielded by the plurality of light-shielding dots 13a, whereby luminance heightening and uniformization of luminance of the backlight unit may be inhibited.

In regard to the light diffusion plate 2, when the average diameter of the plurality of reflecting dots 12a and the ratio of the average diameter of the plurality of light-shielding dots 13a to the average diameter of the plurality of reflecting dots 12a are controlled to fall within the above ranges, fine control of an amount of the rays of light output from the light diffusion plate 2 is facilitated, whereby uniformization of luminance is easily promoted.

As illustrated in FIG. 4, in the light-shielding dot pattern 13, the plurality of light-shielding dots include one light-shielding dot 13a (first light-shielding dot 16a) and a plurality of other light-shielding dots 13a (second light-shielding dots 16a) that are provided to surround the first light-shielding dot 16a, and the light-shielding dot pattern 13 includes a light-shielding region 16 in which a density of the plurality of second light-shielding dots 16b gradually decreases outward in a radial direction of the first light-shielding dot 16a. In other words, the light-shielding region 16 is configured such that, in a plurality of regions having the same width cyclically partitioned (in the present embodiment, in circular shapes) around the first light-shielding dot 16a (more particularly a center of the first light-shielding dot 16a), the density of the at least one light-shielding dot 13a in a more internal region is greater than the density of the at least one light-shielding dot 13a in a more external region. In the present embodiment, the light-shielding region 16 has a circular shape.

The light-shielding dot pattern 13 has a plurality of light-shielding regions 16. Each of the light-shielding regions 16 is provided to correspond to the LED light source 1 on one-to-one basis so as to encompass the light-emitting face 1a of the LED light source 1 in a planar view. The first reflecting dot 15a and the first light-shielding dot 16a overlap in a planar view, and more particularly, a center of the first reflecting dot 15a and a center of the first light-shielding dot 16a are arranged to correspond to each other in a planar view. As a result, the first reflecting dot 15a, the first light-shielding dot 16a and the light-emitting face 1a of the LED light source 1 overlap in a planar view according to the backlight unit, and more particularly, a center of the first reflecting dot 15a, a center of the first light-shielding dot 16a and a center of the light-emitting face 1a of the LED light source 1 are arranged at positions corresponding to one another in a planer view.

In regard to the light diffusion plate 2, the reflecting dot pattern 12 has the plurality of reflecting regions 15, the light-shielding dot pattern 13 includes the plurality of light-shielding regions 16, and the first reflecting dot 15a and the first light-shielding dot 16a overlap in a planar view; therefore, uniformity of luminance of the backlight unit can be improved easily by arranging the first reflecting dot 15a and the first light-shielding dot 16a to overlap the light-emitting face 1a of the LED light source 1 in a planar view.

The plurality of second light-shielding dots 16b are arranged circularly to exhibit nested circles, to surround the first light-shielding dot 16a. In addition, the plurality of second light-shielding dots 16b are arranged radially around the first light-shielding dot 16a. In the light-shielding region 16, a density of the plurality of second light-shielding dots 16b in a more internal circle is greater than a density of the plurality of second light-shielding dots 16b in a more external circle. In other words, an average pitch of the plurality of second light-shielding dots 16b in a more internal circle is smaller than an average pitch of the plurality of second light-shielding dots 16b in a more external circle. In regard to the light diffusion plate 2, due to the plurality of second reflecting dots 15b are arranged circularly to exhibit nested circles, and the plurality of second light-shielding dots 16b are arranged circularly to exhibit nested circles, uniformity of luminance of the backlight unit can be improved more easily.

It is preferred that, among the nested circles, circles in the reflecting region 15 are greater in number than circles in the light-shielding region 16. In regard to the light diffusion plate 2, when the number of the circles in the reflecting region 15 is greater than the number of the circles in the light-shielding region 16, the rays of light transmitted through the reflecting dots 12a can be shielded by the light-shielding dots 13a selectively and effectively in a region where an amount of the rays of light output from the plurality of LED light sources 1 is great, whereby uniformity of luminance of the backlight unit can be further improved.

It is preferred that the plurality of second light-shielding dots 16b are arranged at a constant pitch in each circle. When the plurality of second light-shielding dots 16b are thus arranged at a constant pitch in each circle, a local increase in an amount of rays of light output from a region immediately above the LED light source 1 is inhibited, whereby uniformization of the luminance of the backlight unit may be facilitated. In addition, when the plurality of light-shielding dots 13a are formed to have a uniform diameter, and the average diameter of the light-shielding dots 13a is controlled to fall within the above range, uniformization of the luminance of the backlight unit may be more improved.

It is preferred that the plurality of second light-shielding dots 16b are not sequentially arranged on a straight line passing through a center of the first light-shielding dot 16a. In other words, the second light-shielding dots 16b adjacent in a radial direction of the first light-shielding dot 16a are preferably arranged out of alignment with respect to the radial direction of the first light-shielding dot 16a. When the plurality of second light-shielding dots 16b are not sequentially arranged on a straight line passing through a center of the first light-shielding dot 16a, occurrence of moire may be reduced.

In the plurality of light-shielding regions 16, the light-shielding dots 13a overlap the reflecting dots 12a on one-to-one basis in a planar view. More particularly, in a region overlapping the light-shielding region 16 in a planar view, a pattern of the arrangement of the plurality of reflecting dots 12a is the same as a pattern of the arrangement of the plurality of light-shielding dots 13a. In regard to the light diffusion plate 2, when the light-shielding dots 13a overlap the reflecting dots 12a on one-to-one basis in a planar view in the plurality of light-shielding regions 16, shielding of the rays of light transmitted through the reflecting dots 12a is enabled by the light-shielding dots 13a selectively, whereby uniformity of luminance of the backlight unit can be further improved.

It is to be noted that the light-shielding dot pattern 13 may include at least one light-shielding dot 13a in addition to the plurality of light-shielding regions 16; however, in light of easy and reliable control of rays of light, it is preferred that no light-shielding dot 13a is formed on any region other than the plurality of light-shielding regions 16.

Figure 5:
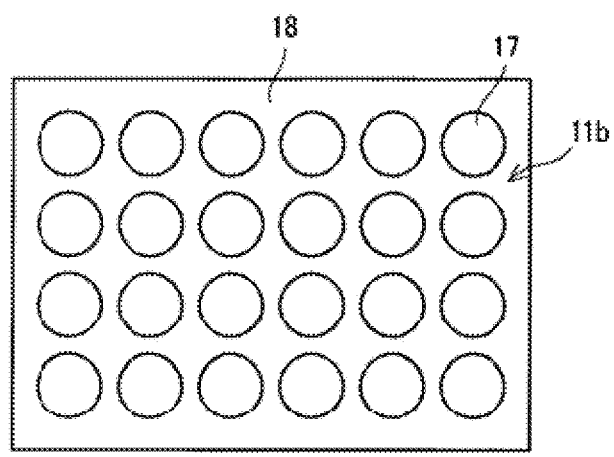
FIG. 5 is a schematic plan view showing arrangement of output light amount-controlling regions on the light diffusion plate illustrated in FIG. 2.

As illustrated in FIG. 5, in regard to the light diffusion plate 2, the reflecting region 15 and the light-shielding region 16 overlapping each other in a planar view constitute an output light amount-controlling region 17 (in FIG. 5, an external edge of the reflecting region 15 is shown as an external edge of the output light amount-controlling region 17). The output light amount-controlling region 17 is provided to correspond to the LED light source 1 on one-to-one basis, in a square grid pattern in the present embodiment. Furthermore, in regard to the light diffusion plate 2, a region other than the plurality of output light amount-controlling regions 17 in a planar view is configured as a light-transmitting region 18 that outputs rays of light directly from the light-outputting face 11b of the substrate layer 11.

Output Light Amount-Controlling Function

An output light amount-controlling function of the light diffusion plate 2 is described in detail hereinafter. Rays of light emitted from an LED light source are typically highly directive; therefore, in the conventional backlight unit, an output light amount tends to be great in a region immediately above a plurality of LED light sources of the light diffusion plate. In this regard, in the backlight unit of the present embodiment, the light diffusion plate 2 has the plurality of reflecting regions 15 provided to correspond to the plurality of LED light sources 1 on one-to-one basis. Consequently, with the light diffusion plate 2, a part of the rays of light emitted from the LED light source 1 is reflected by the plurality of reflecting dots 12a toward the light-incident face 11a of the substrate layer 11, then diffused and reflected by the light diffusing agent contained in the substrate layer 1, thereby being output from a region having a relatively small output light amount, between adjacent LED light sources 1. In regard to the light diffusion plate 2, since the density of the plurality of reflecting dots 12a decreases as being away from the region immediately above the LED light source 1, rays of light reflected by the plurality of reflecting dots 12a can be efficiently output from the region having a relatively small output light amount.

However, since the rays of light emitted from the LED light source 1 are highly directive as described above, for example when a distance between the plurality of LED light sources 1 and the light diffusion plate 2 is decreased due to a demand for a thinner backlight unit, etc., an amount of light transmitted through the plurality of reflecting dots 12a increases, whereby a hot spot is more likely to be generated in the region immediately above the LED light source 1. In addition, in the case of providing high-reflectance reflecting dots containing, for example, a silver pigment in order to inhibit the generation of such a hot spot, an inconvenience of glare is likely to be caused by the reflecting dots. In this regard, in the backlight unit of the present embodiment, due to the light diffusion plate 2 provided with the plurality of light-shielding regions 16 corresponding to the plurality of LED light sources 1 on one-to-one basis, the plurality of light-shielding dots 13a are capable of selectively shielding the rays of light transmitted by the plurality of reflecting dots 12a to inhibit light leakage from the plurality of reflecting dots 12a, whereby generation of a hot spot may be easily and reliably inhibited.

Advantages

The light diffusion plate 2 of the present embodiment is provided with: the reflecting dot pattern 12 that is provided on a side of the light-outputting face 11b of the substrate layer 11 and includes the plurality of reflecting dots 12a; and the light-shielding dot pattern 13 that is provided on a side of the light-outputting face 11b of the substrate layer 11 and includes the plurality of light-shielding dots 13a, the reflecting dot pattern 12 and the light-shielding dot pattern 13 overlapping at least partially in a planar view; therefore, easy and reliable uniformization of the luminance of the backlight unit is enabled.

The backlight unit of the present embodiment includes the light diffusion plate 2 placed on a side of the light-emitting faces 1a of the plurality of LED light sources 1, the light diffusion plate 2 being provided with: the reflecting dot pattern 12 that is provided on a side of the light-outputting face 11b of the substrate layer 11 and includes the plurality of reflecting dots 12a; and the light-shielding dot pattern 13 that is provided on a side of the light-outputting face 11b of the substrate layer 11 and includes the plurality of light-shielding dots 13a, the reflecting dot pattern 12 and the light-shielding dot pattern 13 overlapping at least partially in a planar view; therefore, the luminance can be easily and reliably uniformized.

In the backlight unit of the present embodiment, due to the light diffusion plate 2 having the plurality of reflecting regions 15 and the plurality of light-shielding regions 16, in which the first reflecting dot 15a, the first light-shielding dot 16a and the light-emitting face 1a of the LED light source 1 overlap at least partially in a planar view, uniformity of luminance can be easily improved.

Second Embodiment

Backlight Unit

The backlight unit illustrated in FIG. 6 has a similar configuration to the backlight unit illustrated in FIG. 1, except for the arrangement of the reflecting dot pattern 22 and the light-shielding dot pattern 23 of the light diffusion plate 21. Therefore, the reflecting dot pattern 22 and the light-shielding dot pattern 23 of the light diffusion plate 21 will only be described hereinafter.

Light Diffusion Plate

Reflecting Dot Pattern

The reflecting dot pattern 22 is provided directly on the light-outputting face 11b of the substrate layer 11. The reflecting dot pattern 22 is provided only on a side of the light-outputting face 11b of the substrate layer 11, and not on a side of the light-incident face 11a of the substrate layer 11. The reflecting dot pattern 22 is constituted of a plurality of reflecting dots 22a. The plurality of reflecting dots 22a are formed by a printing procedure similar to that for the plurality of reflecting dots 12a illustrated in FIG. 2. Components, reflectance, and a diameter of the plurality of reflecting dots 22a may be similar to those for the reflecting dots 12a illustrated in FIG. 2.

As illustrated in FIG. 7, in the reflecting dot pattern 22, the plurality of reflecting dots include one reflecting dot 22a (first reflecting dot 25a) and a plurality of other reflecting dots 22a (second reflecting dots 25b) that are provided to surround the first reflecting dot 25a, and the reflecting dot pattern 22 has a reflecting region 25 in which a density of the plurality of second reflecting dots 25b gradually decreases outward in a radial direction of the first reflecting dot 25a. In the present embodiment, the reflecting region 25 has a circular shape.

The reflecting dot pattern 22 has a plurality of reflecting regions 25. In a similar manner to the backlight unit illustrated in FIG. 1, each of the reflecting regions 25 is provided on one-to-one basis with the LED light source 1 so as to encompass the light-emitting face 1a of the LED light source 1 in a planar view.

In a similar manner to the second reflecting dot 15b illustrated in FIG. 3, the plurality of second reflecting dots 25b are arranged circularly to exhibit nested circles, to surround the first reflecting dot 25a. The reflecting dot pattern 22 may include at least one reflecting dot 22a in addition to the plurality of reflecting regions 25; however, in light of easy and reliable control of rays of light, it is preferred that no reflecting dot 22a is formed on any region other than the plurality of reflecting regions 25.

Light-Shielding Dot Pattern

The light-shielding dot pattern 23 is provided on an upper side of the reflecting dot pattern 22. The light-shielding dot pattern 23 is provided only on a side of the light-outputting face 11b of the substrate layer 11, and not on a side of the light-incident face 11a of the substrate layer 11. In the light diffusion plate 21, the substrate layer 11, the reflecting dot pattern 22 and the light-shielding dot pattern 23 are provided in this order in a direction of light emission of the plurality of LED light sources 1.

The light-shielding dot pattern 23 is constituted of a plurality of light-shielding dots 23a. The plurality of light-shielding dots 23a are formed by a printing procedure similar to that for the plurality of light-shielding dots 13a illustrated in FIG. 2. In addition, components, light absorbing ration, and a diameter of the plurality of light-shielding dots 23a may be similar to those for the light-shielding dots 13a illustrated in FIG. 2.

Figure 8:
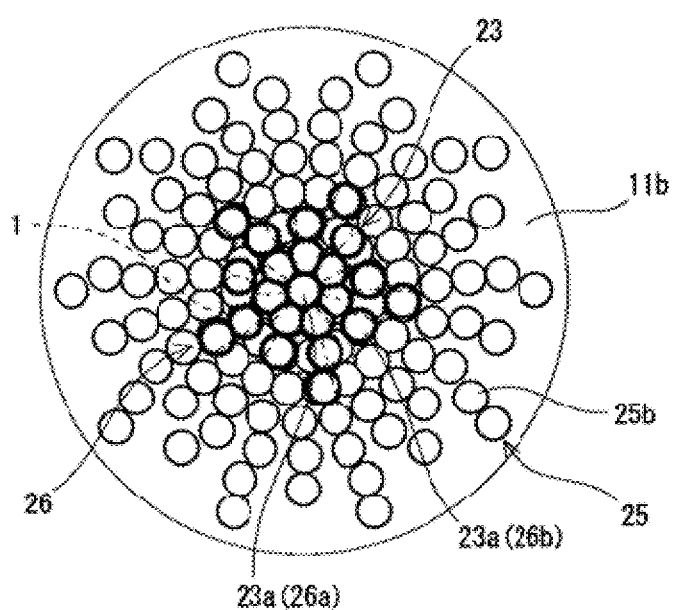
FIG. 8 is a schematic plan view showing the reflecting region and a light-shielding region on the light diffusion plate illustrated in FIG. 6.

As illustrated in FIG. 8, in the light-shielding dot pattern 23, the plurality of light-shielding dots include one light-shielding dot 23a (first light-shielding dot 26a) and a plurality of other light-shielding dots 23a (second light-shielding dots 26a) that are provided to surround the first light-shielding dot 26a, and the light-shielding dot pattern 23 has a light-shielding region 26 in which a density of the plurality of second light-shielding dots 26b gradually decreases outward in a radial direction of the first light-shielding dot 26a. In the present embodiment, the light-shielding region 26 has a circular shape.

The light-shielding dot pattern 23 has a plurality of light-shielding regions 26. In a similar manner to the backlight unit illustrated in FIG. 1, each of the light-shielding regions 26 is provided on one-to-one basis with the LED light source 1 so as to encompass the light-emitting face 1a of the LED light source 1 in a planar view.

In a similar manner to the second light-emitting dot 16b illustrated in FIG. 4, the plurality of second light-emitting dots 26b are arranged circularly to exhibit nested circles, to surround the first light-emitting dot 26a. It is preferred that, among the nested circles, circles in the reflecting region 25 are greater in number than circles in the light-shielding region 26.

In the plurality of light-shielding regions 26, the plurality of light-shielding dots 23a partially overlap the plurality of reflecting dots 22a in a planar view. The number of the plurality of light-shielding dots 23a in the light-shielding region 26 is smaller than the number of the plurality of reflecting dots 22a that overlap the light-shielding dots 23a in a planar view. In regard to the light diffusion plate 21, since the number of the plurality of light-shielding dots 23a in the light-shielding region 26 is smaller than the number of the plurality of reflecting dots 22a that overlap the light-shielding dots 23a in a planar view, the rays of light transmitted through the plurality of reflecting dots 22a are partially absorbed by the plurality of light-shielding dots 23a. Thus, the light diffusion plate 21 is capable of easily preventing an undue reduction in luminance in the regions immediately above the plurality of LED light sources 1 of the backlight unit. In other words, when the light-shielding dots 13a overlap the reflecting dots 12a on one-to-one basis in a similar manner to the backlight unit illustrated in FIG. 1, uniformization of luminance of the backlight unit can be facilitated by selectively shielding the rays of light transmitted through the reflecting dots 12a, by the light-shielding dots 13a. On the other hand, in the backlight unit illustrated in FIG. 6, since the light-shielding dots 23a do not overlap the reflecting dots 22a on one-to-one basis, a part of the rays of light output from the light-outputting face 11b of the substrate layer 11 without being incident onto the plurality of reflecting dots 22a is highly likely to be shielded by the plurality of light-shielding dots 23a. However, when the number of the plurality of light-shielding dots 23a is smaller than the number of the plurality of reflecting dots 22a, a part of the rays of light transmitted through the plurality of reflecting dots 22a is not absorbed by the plurality of light-shielding dots 23a, whereby the light diffusion plate 21 is capable of preventing an undue reduction in luminance in the region immediately above the LED light source 1 of the backlight unit, whereby the luminance can be uniformized.

It is to be noted that the light-shielding dot pattern 23 may include at least one light-shielding dot 23a in addition to the plurality of light-shielding regions 26; however, in light of easy and reliable control of rays of light, it is preferred that no light-shielding dot 23a is formed on any region other than the plurality of light-shielding regions 26.

Other Embodiments

The embodiments disclosed herein should be construed as being not restrictive but illustrative in all terms. The scope of the present invention is not limited to the constitutions of the aforementioned embodiments, and including claimed features, equivalents to claims, and all modifications within the scope of claims is intended.

For example, as illustrated in FIG. 9, in the light diffusion plate, the reflecting dot pattern 32 may be provided on a side of the light-outputting face 11b of the substrate layer 11, while the light-shielding dot pattern 33 may be provided on a side of the light-incident face 11a of the substrate layer 11. In this configuration, since an amount of light incident onto the reflecting dot pattern 32 can be reduced beforehand by the light-shielding dot pattern 33, uniformization of luminance of the backlight unit is enabled even when rays of light are partially transmitted through the reflecting dot pattern 32.

For example, as illustrated in FIG. 10, in the light diffusion plate, the light-shielding dot pattern 43 may be provided directly on the light-outputting face 11b of the substrate layer 11, while the reflecting dot pattern 43 may be provided on the light-shielding dot pattern 43. Also in this configuration, since an amount of light incident onto the reflecting dot pattern 42 can be reduced beforehand by the light-shielding dot pattern 43, uniformization of luminance of the backlight unit is enabled even when rays of light are partially transmitted through the reflecting dot pattern 42.

Alternatively, in the light diffusion plate, both of the reflecting dot pattern and the light-shielding dot pattern may be provided on a side of the light-incident face of the substrate layer. Yet alternatively, in the light diffusion plate, the reflecting dot pattern and/or the light-shielding dot pattern may be provided on both sides of the light-incident face and the light-outputting face of the substrate layer.

The arrangement of the plurality of reflecting dots constituting the reflecting dot pattern and the arrangement of the plurality of light-shielding dots constituting the light-shielding dot pattern may be designed in accordance with a shape of the light-emitting face of the light source. For example, in the case of the light-emitting face of the light source being rectangular, elliptical, etc. elongated in one direction, the reflecting dot pattern may include a plurality of first reflecting dots sequentially arranged along a longitudinal direction of the light-emitting face, and a plurality of second reflecting dots provided to surround the plurality of first reflecting dots. Also, the light-shielding dot pattern may include a plurality of first light-shielding dots sequentially arranged along the longitudinal direction of the light-emitting face, and a plurality of second light-shielding dots provided to surround the plurality of first light-shielding dots.

The plurality of second reflecting dots may also be arranged spirally around the at least one first reflecting dot. Also, the plurality of second light-shielding dots may be arranged spirally around the at least one first light-shielding dot.

A specific configuration of the backlight unit of the present embodiment is not limited to the configuration illustrated in FIG. 1. For example, in the backlight unit, an optical sheet may not be provided on a side of the light-emitting face of the light diffusion plate. In addition, the backlight unit may be provided with only one light source. Furthermore, the backlight unit produces a particularly superior effect when an LED light source that is highly directive is used; however, the light source may not necessarily be an LED light source.

As described above, the backlight unit of the present embodiment is suitably used as a direct-lit backlight unit for a liquid crystal display device, but may also be used as a backlight unit for an illumination device, for example.

EXAMPLES

Hereinafter, the embodiment of the present invention will be explained more in detail by way of Examples; however, the present invention is not in any way limited to these Examples.

Example

Light Diffusion Plate

Figure 11:
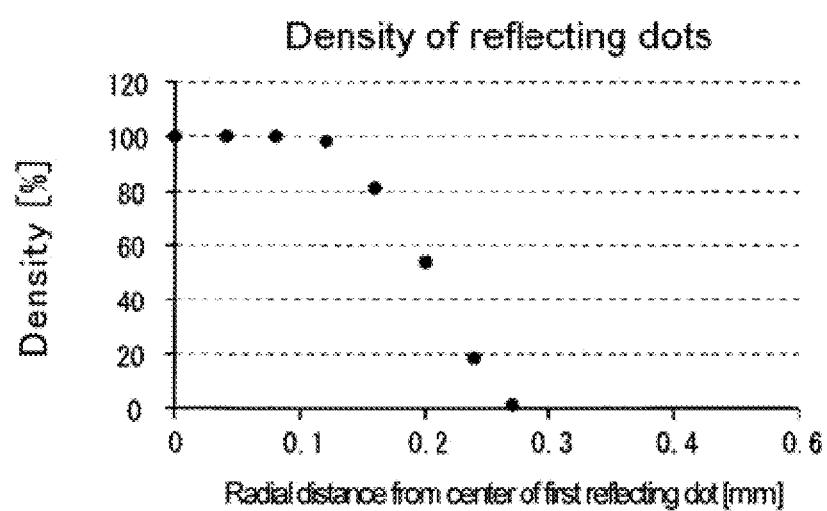
FIG. 11 is a graph showing a relationship between a radial distance from a center of a first reflecting dot and a density of the reflecting dots in Example.

A reflecting dot pattern was provided on a light-emitting face of a substrate layer having an average thickness of 0.2 mm in which a light diffusing agent is contained in a resin matrix in a dispersed manner. The reflecting dot pattern had a plurality of reflecting regions arranged in a square grid pattern. In each reflecting region, first reflecting dots and second reflecting dots were provided in an arrangement shown in FIG. 7. In regard to the plurality of reflecting dots constituting the reflecting dot pattern, an average diameter was 40 μm and reflectance was 70%. In addition, a light-shielding dot pattern was provided on the reflecting dot pattern. The light-shielding dot pattern had a plurality of light-shielding regions provided in a square grid pattern. In each light-shielding region, the first light-shielding dots and the second light-shielding dots were provided in an arrangement shown in FIG. 8, and a center of the first light-shielding dot corresponded to a center of the first reflecting dot. In regard to the plurality of light-shielding dots constituting the light-shielding dot pattern, an average diameter was 40 μm and reflectance was 25%. A relationship between a radial distance from a center of the reflecting region (center of the first reflecting dot) and a density of the reflecting dots of the light diffusion plate is shown in FIG. 11. A relationship between a radial distance from a center of the light-shielding region (center of the first light-shielding dot) and a density of the light-shielding dots of the light diffusion plate is shown in FIG. 12. The reflectance of the plurality of reflecting dots was measured by using a spectrophotometer "V-670" available from JASCO Corporation.

Backlight Unit

The aforementioned light diffusion plate was placed on a side of light-emitting faces of a plurality of LED light sources arranged in a square grid pattern at a pitch of 1.2 mm, in such a way that the light-emitting faces of the plurality of LED light sources were opposed to a light-incident face of the substrate layer. The light-emitting faces of the plurality of LED light sources each had a circular shape of 0.2 mm in diameter. A center of each light-emitting face of the plurality of LED light sources, a center of the first reflecting dot, and a center of the first light-shielding dot were arranged to correspond in a planar view.

Comparative Example

A light diffusion plate similar to that of Example was produced except that the light-shielding dot pattern was not provided. The aforementioned light diffusion plate was placed on a side of light-emitting faces of a plurality of LED light sources having a constitution similar to Example, in such a way that the light-emitting faces of the plurality of LED light sources were opposed to a light-incident face of the substrate layer. A center of each light-emitting face of the plurality of LED light sources and a center of the first reflecting dot were arranged to correspond in a planar view.

Evaluation Results

Figure 13:
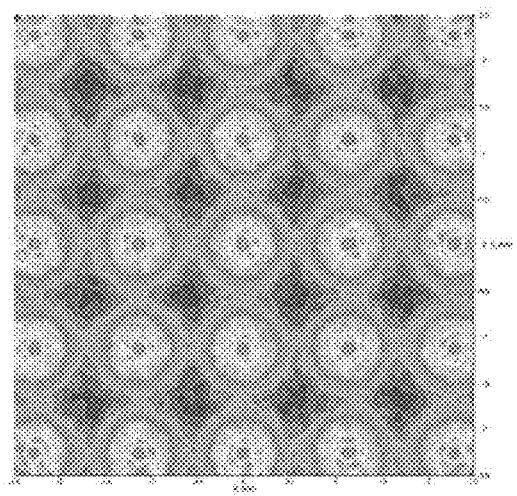
FIG. 13 is a planar image showing luminance distribution of a backlight unit of Example.
Figure 14:
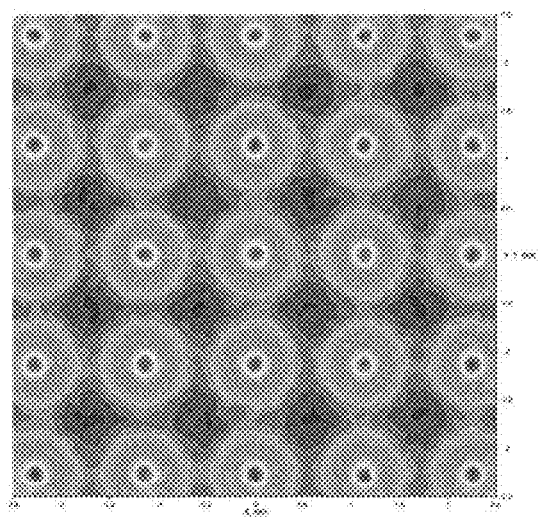
FIG. 14 is a planar image showing luminance distribution of a backlight unit of Comparative Example.
Figure 15:
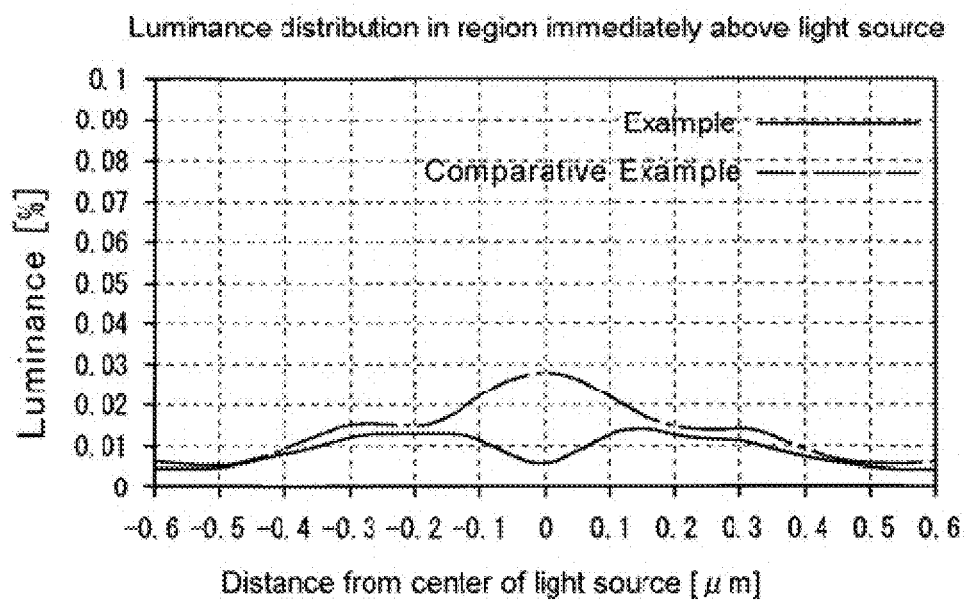
FIG. 15 is a graph showing luminance distribution in a region immediately above an LED light source of the backlight units of each of Example and Comparative Example.

A planar image showing luminance distribution of the backlight unit of Example is shown in FIG. 13, while a planar image showing luminance distribution of the backlight unit of Comparative Example is shown in FIG. 14. Furthermore, luminance distribution in a region immediately above the LED light source of the backlight unit of each of Example and Comparative Example is shown in FIG. 15. As shown in FIGS. 13 and 15, in the backlight unit provided with the light diffusion plate of Example, luminance of the region immediately above the LED light source and luminance of other region were uniformized, whereby generation of a hot spot was inhibited. On the other hand, in the backlight unit provided with the light diffusion plate of Comparative Example, luminance of the region immediately above the LED light source was locally increased to generate a hot spot, as shown in FIGS. 14 and 15.

INDUSTRIAL APPLICABILITY

As explained in the foregoing, the light diffusion plate of the embodiment of the present invention enables uniformization of luminance of the backlight unit easily and reliably, and thus can be suitably used for a direct-lit backlight unit of a liquid crystal display device.

EXPLANATION OF THE REFERENCE SYMBOLS

1 LED light source
1a Light-emitting face
2, 21 Light diffusion plate
3 Optical sheet
4 Liquid crystal panel
11 Substrate layer
11a Light-incident face
11b Light-outputting face 12, 22, 32, 42 Reflecting dot pattern
12a, 22a Reflecting dot
13, 23, 33, 43 Light-shielding dot pattern
13a, 23a Light-shielding dot
15, 25 Reflecting region
15a, 25a First reflecting dot
15b, 25b Second reflecting dot
16, 26 Light-shielding region
16a, 26a First light-shielding dot
16b, 26b Second Light-shielding dot
17 Output light amount-controlling region
18 Light-transmitting region

What is claimed is:

1. A light diffusion plate to be placed on a side of a light-emitting face of at least one light source, the light diffusion plate comprising:
    a substrate layer that is light-diffusible and comprises a light-incident face to be opposed to the light-emitting face, and a light-outputting face on an opposite side of the light-incident face;
    a reflecting dot pattern that is provided on a side of the light-incident face or the light-outputting face of the substrate layer and comprises a plurality of reflecting dots; and
    a light-shielding dot pattern that is provided on a side of the light-incident face or the light-outputting face of the substrate layer and comprises a plurality of light-shielding dots,
    wherein the reflecting dot pattern and the light-shielding dot pattern overlap at least partially in a planar view.

2. The light diffusion plate according to claim 1, wherein:
    the plurality of reflecting dots comprise at least one first reflecting dot and a plurality of second reflecting dots that surround the at least one first reflecting dot, and the reflecting dot pattern comprises at least one reflecting region in which a density of the plurality of second reflecting dots gradually decreases outward in a radial direction of the first reflecting dot;
    the plurality of light-shielding dots comprise at least one first light-shielding dot and a plurality of second light-shielding dots that surround the at least one first light-shielding dot, and the light-shielding dot pattern comprises at least one light-shielding region in which a density of the plurality of second light-shielding dots gradually decreases outward in a radial direction of the first light-shielding dot; and
    the at least one first reflecting dot and the at least one first light-shielding dot overlap at least partially in a planar view.

3. The light diffusion plate according to claim 2, wherein the plurality of second reflecting dots are arranged circularly to exhibit nested circles on an outer side of the at least one reflecting dot, and the plurality of second light-shielding dots are arranged circularly to exhibit nested circles on an outer side of the at least one first light-shielding dot.

4. The light diffusion plate according to claim 3, wherein, among the nested circles, circles in the reflecting region are greater in number than circles in the light-shielding region.

5. The light diffusion plate according to claim 4, wherein, in the at least one light-shielding region, the light-shielding dots overlap the reflecting dots on one-to-one basis in a planar view.

6. The light diffusion plate according to claim 1, wherein
    an average diameter of the plurality of reflecting dots is no less than 1 μm and no greater than 60 μm, and
    a ratio of an average diameter of the plurality of light-shielding dots to the average diameter of the plurality of reflecting dots is no less than 0.7 and no greater than 1.3.

7. The light diffusion plate according to claim 1, wherein the substrate layer, the reflecting dot pattern and the light-shielding dot pattern are provided in this order in a direction of light emission of the at least one light source.

8. A backlight unit comprising
    at least one light source comprising a light-emitting face, and
    a light diffusion plate placed on a side of the light-emitting face of the at least one light source, wherein
    the light diffusion plate comprises:
    a substrate layer that is light-diffusible and comprises a light-incident face opposed to the light-emitting face, and a light-outputting face on an opposite side of the light-incident face;
    a reflecting dot pattern that is provided on a side of the light-incident face or the light-outputting face of the substrate layer and comprises a plurality of reflecting dots; and
    a light-shielding dot pattern that is provided on a side of the light-incident face or the light-outputting face of the substrate layer and comprises a plurality of light-shielding dots,
    wherein the reflecting dot pattern and the light-shielding dot pattern overlap at least partially in a planar view.

9. The backlight unit according to claim 8, wherein:
    the plurality of reflecting dots comprise at least one first reflecting dot and a plurality of second reflecting dots that surround the at least one first reflecting dot, and the reflecting dot pattern comprises at least one reflecting region in which a density of the plurality of second reflecting dots gradually decreases outward in a radial direction of the first reflecting dot;
    the plurality of light-shielding dots comprise at least one first light-shielding dot and a plurality of second light-shielding dots that surround the at least one first light-shielding dot, and the light-shielding dot pattern comprises at least one light-shielding region in which a density of the plurality of second light-shielding dots gradually decreases outward in a radial direction of the first light-shielding dot; and
    the at least one first reflecting dot, the at least one first light-shielding dot, and the light-emitting face of the light source overlap at least partially in a planar view.

* * * * *